US005131520A

United States Patent [19]

Johnson et al.

[11] Patent Number: 5,131,520

[45] Date of Patent: Jul. 21, 1992

[54] ESCALATOR HANDRAIL GUIDE

[75] Inventors: Gerald E. Johnson, Farmington; James A. Rivera, Bristol; Arthur McClement, Burlington, all of Conn.

[73] Assignee: Otis Elevator Company, Farmington, Conn.

[21] Appl. No.: 790,792

[22] Filed: Nov. 12, 1991

[51] Int. Cl.[5] .............................. B65G 15/00
[52] U.S. Cl. .............................. 198/335
[58] Field of Search .............................. 198/335, 337, 841

[56] References Cited

U.S. PATENT DOCUMENTS

| | | | |
|---|---|---|---|
| 3,981,118 | 9/1976 | Johnson et al. | 198/335 X |
| 4,598,811 | 7/1986 | Hanano et al. | 198/335 |
| 4,666,028 | 5/1987 | Saito et al. | 198/335 |
| 4,932,512 | 6/1990 | Rivera | 198/335 X |
| 4,946,020 | 8/1990 | Rivera et al. | 198/335 |

FOREIGN PATENT DOCUMENTS

| | | | |
|---|---|---|---|
| 2104471 | 3/1983 | United Kingdom | 198/335 |

*Primary Examiner*—Joseph E. Valenza
*Assistant Examiner*—Tuan N. Nguyen
*Attorney, Agent, or Firm*—William W. Jones

[57] ABSTRACT

The escalator handrail guide rail assembly includes a metal base which can be snap fitted onto a glass escalator or walkway balustrade. A low friction plastic strip is fitted onto the top of the base for contact with the handrail, and a metal reinforcing piece is snap fitted onto the base over the plastic strip to hold the latter in place, and to reinforce the plastic strip. The reinforcing piece is formed from two identical interleaved strips which can be attached to and detached from the base without the use of any tools more specialized than a rubber mallet and without the use of separate fasteners such as screws, bolts, or the like.

6 Claims, 2 Drawing Sheets

ESCALATOR HANDRAIL GUIDE

DESCRIPTION

1. Technical Field

This invention relates to a handrail guide assembly for guiding movement of an escalator or moving walkway handrail over a balustrade. More particularly, the invention relates to a handrail guide assembly which can be easily and quickly installed on the balustrade without the need of specialized tools.

2. Background Art

The problem of heat generation on an escalator or moving walkway handrail has been addressed in the prior art. Handrail heat is generated by friction between the moving handrail and the stationary handrail guide. One solution offered to mitigate handrail heat is to use low coefficient of friction plastic components in the guide to form the actual contact portions of the guide. U.S. Pat. No. 4,946,020 granted Aug. 7, 1990 to James A. Rivera, et al. discloses a low friction handrail guide which includes an extruded base having a balustrade-receiving channel, a low friction plastic track mounted on the base, and a steel reinforcing plate overlying the plastic track and screwed into the base to pin the track to the base, and to provide lateral strength to the plastic track. This handrail guide provides good operational and performance characteristics, but its installation and repair is a timeconsuming job, and requires many screws, which can be lost during installation.

DISCLOSURE OF THE INVENTION

The handrail guide of this invention provides the same high performance and operational characteristics as the guide disclosed in the U.S. Pat. No. 4,946,020 patent, but can be installed quickly and easily, can be disassembled quickly and easily, and does not require any auxiliary fasteners such as the screws used to install the aforesaid prior art guide.

The guide of this invention includes an extruded metal base which can be press fitted onto a glass balustrade in the same way as the aforesaid prior art guide base. The side walls of the base are formed with a series of spaced apart oppositely paired pockets therein. The guide includes a low coefficient of friction plastic strip which overlies the top surface of the base, and includes laterally enlarged side rail parts which form the sliding contact surfaces on the guide which engage the handrail as it slides over the guide. The plastic strip has a series of openings formed therein inboard of the rail parts, which openings overlie and register with the base pockets. The steel reinforcement strip has a plurality of spring clips secured to its underside. The spring clips are aligned with and pass through the openings in the plastic strip and into the base pockets whereby the clips snap onto the base pockets. The assembly is thus secured together with the reinforcement strip being secured to the base and pinning the plastic rail strip in place on the base.

It is therefore an object of this invention to provide an improved escalator or the like handrail guide with low friction characteristics to reduce heat imparted to the handrail.

It is a further object of this invention to provide a handrail guide of the character described which can be assembled and disassembled without requiring auxiliary fasteners such as screws, bolts, or the like.

It is another object of this invention to provide a handrail guide of the character described which can be quickly and easily assembled and disassembled without the need of any specialized tools.

These and other objects and advantages of the invention will become more readily apparent to one skilled in the art from the following detailed description of a preferred embodiment thereof when taken in conjunction with the accompanying drawings, in which:

BEST MODE FOR CARRYING OUT THE INVENTION

Figure 2:
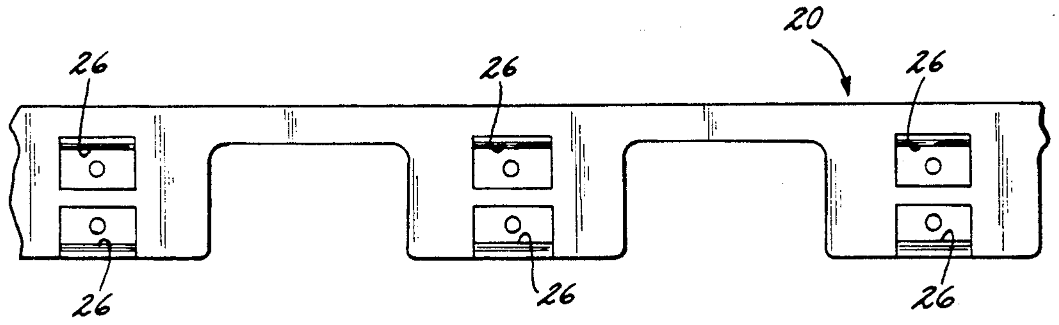
FIG. 2 is a plan view of the underside of a part of one of the steel strip reinforcing components of the assembly of FIG. 1.
Figure 1:
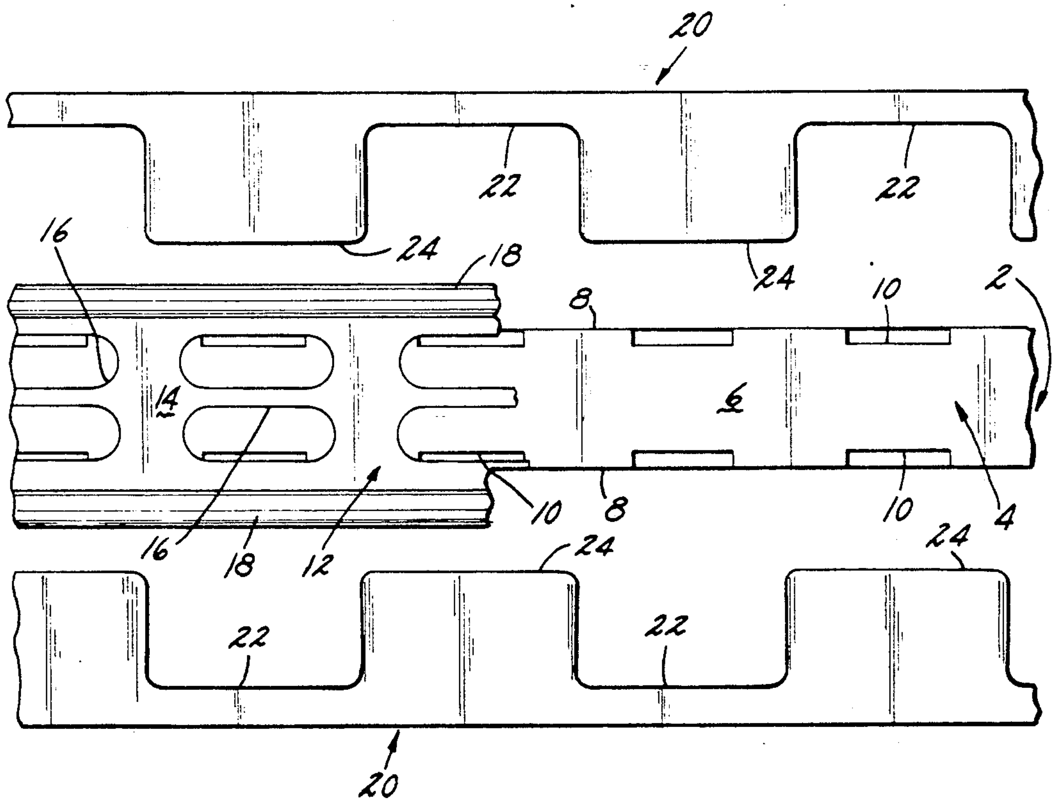
FIG. 1 is an exploded fragmented top plan view of a preferred embodiment of the handrail guide assembly of this invention.
Figure 3:
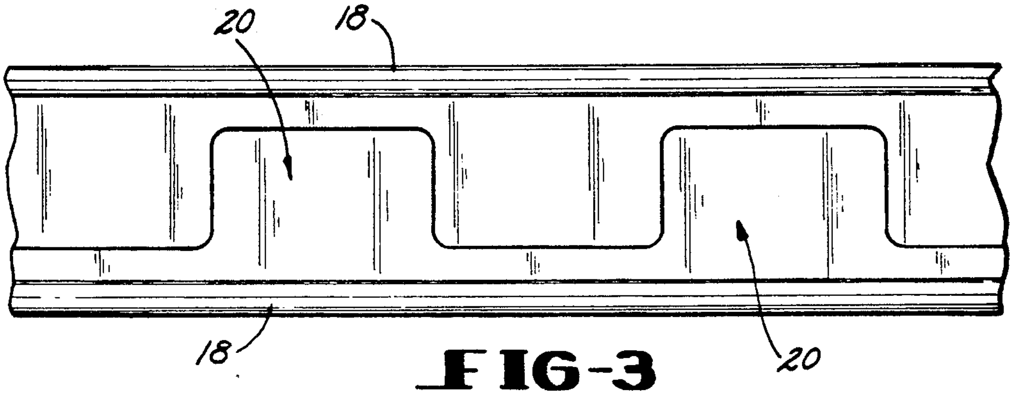
FIG. 3 is a top plan view of the assembled handrail guide of FIG. 1.

Referring now to the drawings, there is shown in FIG. 1 a fragmented exploded view of a preferred embodiment of the handrail guide assembly, as viewed in plan from the top. The assembly is denoted generally by the numeral 2 and includes an extruded metal base 4, preferably formed from aluminum having a top surface 6 and opposed side surfaces 8. Pockets 10 are cut into the side surfaces 8 of the base 4 at preselected spaced-apart locations. The pockets 10 may be disposed in opposed and aligned pairs, such as shown in FIG. 1. A strip 12 of a slippery polymer such as ultra high molecular weight polyethylene overlies the base 4. The polymer strip 12 has a central web 14 with apertures 16 disposed therein, which apertures 16 overlie and are aligned with the pockets 10 in the base 4. The strip 12 also includes lateral raised tracks 18 which are outboard of the sides 8 of the base 4, and which form the handrail-contact surfaces of the guide assembly. A pair of metal fastener strips 20 which are formed with alternating recesses 22 and tongues 24 which are interleaved when the strips 20 are fastened to the base 4, as shown in FIG. 3. The tongues 24 overlie the web 14 and web apertures 16, and carry spring clips 26 on their undersides, as shown in FIG. 2. When the fastener strips 20 are pressed down on the track strip 12 and base 4, the clips 26 pass through the apertures 16 and clip onto the base pockets 10. The track strip 12 is thus pinned to the base 4 by the fastener strips 20.

Figure 4:
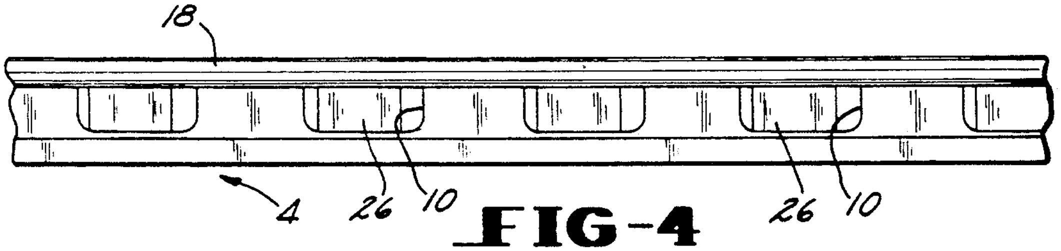
FIG. 4 is a side elevational view of the handrail guide.
Figure 5:
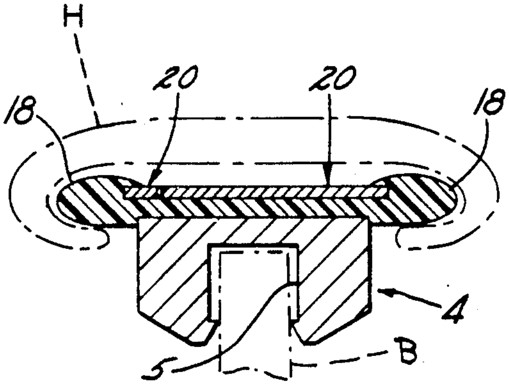
FIG. 5 is a transverse sectional view of the guide.

FIGS. 3-5 show the assembled guide rail assembly, and illustrate how the tracks 18 flank the fastener strips 20, how the clips 26 fit into the pockets 10, and how the handrail H (shown in phantom) rides on the guide assembly. FIG. 5 shows the channel 5 in the bottom of the base 4 which allows the assembly to be fitted onto a glass balustrade B (shown in phantom) or the like.

It will be readily appreciated that the handrail guide rail assembly of this invention can be quickly and easily assembled and disassembled without requiring any special tools, and without the use of myriad small fasteners, such as screws or nuts and bolts. The assembly provides for low friction, low heat generation operation of the handrail available in the prior art assemblies.

Since many changes and variations of the disclosed embodiment of the invention may be made without departing from the inventive concept, it is not intended to limit the invention otherwise than as required by the appended claims.

What is claimed is:

1. A handrail guide assembly adapted to be mounted on the balustrade of an escalator or the like, said guide assembly comprising:

a) a metal base adapted to be fitted onto a top edge of the balustrade;

b) a handrail-contacting and guiding track disposed on said base, said track being formed from a low coefficient of friction plastic material; and c) metal reinforcing strip means overlying a central portion of said track on the side thereof away from said base whereby said track is sandwiched between said base and said strip means, said strip means including a plurality of spring clips mounted on and depending from the surface of said strip means facing the track, said track includes a plurality of openings aligned with opposite sides of said base, and wherein said strip means spring clips extend through said openings and clamp onto said base to pin said track to said base.

2. The handrail guide assembly of claim 1 wherein said sides of said base are provided with spaced-apart pockets for receiving said strip means spring clips.

3. The handrail guide assembly of claim wherein said strip means comprises two halves each of which includes a portion of said spring clips whereby each of said halves is separately clamped to said base.

4. The handrail guide assembly of claim 3 wherein each of said halves is formed with alternating tongues and recesses; said spring clips being mounted on said tongues; and the tongues on one of said halves being interleaved between the tongues on the other of said halves.

5. An escalator or the like handrail guide assembly comprising:

a) a balustrade;

b) a metal handrail guide assembly base mounted on said balustrade;

c) a low friction plastic handrail guide track mounted on said base;

d) metal reinforcing strip means overlying a central portion of said track of the side thereof away from base whereby said track is sandwiched between said base and said strip means, said strip means being formed from two halves each of which is provided with a plurality of spring clips mounted on and depending from the surface thereof facing the track with the spring clips on one half being interleaved with the spring clips of the other half, said track includes a central web portion having axially spaced apart openings therein, and wherein said spring clips extend through said openings past said track and clamp onto said base to pin said track to said base.

6. The handrail guide assembly of claim 5 wherein said side walls of said base are formed with spaced sets of pairs of pockets which receive said spring clips.

* * * * *